(12) United States Patent
Lofthus et al.

(10) Patent No.: US 7,742,185 B2
(45) Date of Patent: Jun. 22, 2010

(54) PRINT SEQUENCE SCHEDULING FOR RELIABILITY

(75) Inventors: Robert M. Lofthus, Webster, NY (US);
Kristine A. German, Webster, NY (US);
Norman W. Zeck, Ontario, NY (US);
Gregory J. Kott, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1536 days.

(21) Appl. No.: 10/924,458

(22) Filed: Aug. 23, 2004

(65) Prior Publication Data

US 2006/0039026 A1    Feb. 23, 2006

(51) Int. Cl.
*G06F 3/12* (2006.01)
*G06K 1/00* (2006.01)

(52) U.S. Cl. ...................... 358/1.15; 358/1.9

(58) Field of Classification Search ............... 358/1.16, 358/1.15, 1.9, 1.14; 399/82, 87; 718/102, 718/103, 104, 105, 106; 700/100, 101
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,095,369 A | 3/1992 | Ortiz et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |

(Continued)

FOREIGN PATENT DOCUMENTS

GB    2 368 954 A    5/2002

(Continued)

OTHER PUBLICATIONS

"Xerox Disclosure Journal", publication of Nov.-Dec. 1991, vol. 16, No. 6, pp. 381-383 by Paul F. Morgan.

(Continued)

*Primary Examiner*—Dov Popovici
*Assistant Examiner*—Thomas J Lett
(74) *Attorney, Agent, or Firm*—Fay Sharpe LLP; Eugene O. Palazzo

(57) ABSTRACT

A method for scheduling print jobs for a plurality of printers (40, 42, 44, 46, 48, 50) includes, for each of a plurality of print jobs, determining a number of pages of a first print modality (such as black only printing) and of a second print modality (such as color printing) for the print job. A file header is determined, based on the number of pages of the first and second print modalities in the print job. The file header is associated with the print job and the print job transmitted, along with the file header, to a print job scheduler (10). The scheduler schedules a sequence for printing the plurality of print jobs by the plurality of printers, based on minimizing, for at least one of the plurality of printers, a number of periods of time during the sequence of printing where the at least one printer is in a non-operational mode; and/or maximizing continuous run time for at least one of the printers.

15 Claims, 5 Drawing Sheets

U.S. PATENT DOCUMENTS

| | | | |
|---|---|---|---|
| 5,363,175 | A | 11/1994 | Matysek |
| 5,389,969 | A | 2/1995 | Suzuki et al. |
| 5,435,544 | A | 7/1995 | Mandel |
| 5,473,419 | A | 12/1995 | Russel et al. |
| 5,489,969 | A | 2/1996 | Soler et al. |
| 5,504,568 | A | 4/1996 | Saraswat et al. |
| 5,525,031 | A | 6/1996 | Fox |
| 5,557,367 | A | 9/1996 | Yang et al. |
| 5,568,246 | A | 10/1996 | Keller et al. |
| 5,570,172 | A | 10/1996 | Acquaviva |
| 5,596,416 | A | 1/1997 | Barry et al. |
| 5,617,214 | A | 4/1997 | Webster et al. |
| 5,629,762 | A | 5/1997 | Mahoney et al. |
| 5,668,942 | A | 9/1997 | Fromherz |
| 5,696,893 | A | 12/1997 | Fromherz et al. |
| 5,701,557 | A | 12/1997 | Webster et al. |
| 5,710,873 | A | 1/1998 | Romano et al. |
| 5,771,339 | A | 6/1998 | Fromherz |
| 5,778,377 | A | 7/1998 | Marlin et al. |
| 5,781,710 | A | 7/1998 | Fromherz et al. |
| 5,835,688 | A | 11/1998 | Fromherz |
| 5,884,910 | A | 3/1999 | Mandel |
| 5,995,721 | A | 11/1999 | Rourke et al. |
| 6,057,930 | A | 5/2000 | Blossey et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,385,412 | B1 * | 5/2002 | Sadakuni ............... 399/75 |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,509,974 | B1 * | 1/2003 | Hansen ............... 358/1.12 |
| 6,519,053 | B1 | 2/2003 | Motamed et al. |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,618,167 | B1 | 9/2003 | Shah |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,654,136 | B2 | 11/2003 | Shimada |
| 6,687,018 | B1 | 2/2004 | Leong et al. |
| 6,718,878 | B2 | 4/2004 | Grosso et al. |
| 6,819,445 | B1 | 11/2004 | Stevenson et al. |
| 6,819,906 | B1 | 11/2004 | Herrmann et al. |
| 6,856,411 | B1 | 2/2005 | Purvis et al. |
| 6,970,261 | B1 * | 11/2005 | Robles ............... 358/1.15 |
| 7,265,855 | B2 * | 9/2007 | Patton ............... 358/1.15 |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |

OTHER PUBLICATIONS

"Tax" publication "Cluster Printing Solution Announced" (Aug. 3, 2001).
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102.899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.

* cited by examiner

PRINT SEQUENCE SCHEDULING FOR RELIABILITY

BACKGROUND

The present exemplary embodiment relates to a scheduling system. It finds particular application in conjunction with scheduling print jobs for improving the reliability of a printing system and will be described with particular reference thereto. However, it is to be appreciated that the present exemplary embodiment is also amenable to other like applications.

Electronic printing systems typically employ a scanner for scanning image-bearing documents and conversion electronics for converting the image to image signals or pixels. The signals are stored and are read out successively to a printer for formation of the images on photoconductive output media such as a photoreceptor. When multiple jobs are to be sequentially printed, a process known as "job streaming" is commonly implemented. Job streaming is the ability of a printer system to complete successive printing jobs with a minimum of delay time between jobs. A control system associated with the image output terminal (IOT) of the machine identifies that multiple jobs have been scheduled, determines their characteristics and determines the necessary delay between jobs. In some cases, the control system will enable a second job to begin printing prior to completion of the first job.

U.S. Pat. No. 6,618,167 to Shah, the disclosure of which is incorporated herein by reference, provides a scheduling scheme to improve the productivity of printers, particularly color printers. The scheduling scheme accounts for difference in the rasterization execution time of some print jobs.

U.S. Pat. No. 5,095,369 to Ortiz, et al., incorporated herein by reference, discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

Printing systems now being developed may employ multiple print engines for black, process (or full) color, and custom color (single color or monochrome) printing of selected pages within a print job. The following references, the disclosures of which are incorporated by reference in their entireties, variously relating to what have been variously called "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No. 5,389,969 to to Soler, et al.; a 1991 "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced."

Intermittent use of xerographic printers, characterized by relatively frequent on-off cycles has been shown, statistically, to lead to lower reliability. As with the operation of a car, startup and stopping are much more stressful than constant operation. Using a printer casually for relatively short jobs is much more stressful, as measured by maintenance costs per page, than running the same printer more continuously.

BRIEF DESCRIPTION

In accordance with one aspect of the present exemplary embodiment, a method for scheduling print jobs for a plurality of printers is provided. The method includes, for each of a plurality of print jobs, performing a conversion scan including determining a number of pages of a first print modality for the print job and determining a number of pages of a second print modality for the print job. A file header is determined, based on the number of pages of the first print modality and the number of pages of the second print modality in the print job. The file header is associated with the print job. The print job is transmitted along with the file header to a print job scheduler. A sequence of printing the plurality of print jobs by the plurality of printers is scheduled, based on at least one of minimizing, for at least one of the plurality of printers, a number of periods of time during the sequence of printing where the at least one printer is in a non-operational mode and maximizing continuous run time during the sequence of printing for at least one of the printers.

In accordance with another aspect of the present exemplary embodiment, a method for scheduling print jobs for a printer is provided. The method includes, for each of a plurality of print jobs, by computer implemented means, determining a number of pages of a first print modality for the print job, determining a number of pages of a second print modality for the print job, and determining a file header based on the number of pages of the first modality and the number of pages of the second modality in the print job. The file header is associated with the print job and the print job transmitted, along with the file header, to a print job scheduler. A sequence is scheduled for printing of the plurality of print jobs by a plurality of printers. The sequence is predicted to lead to an increase in reliability of the plurality of printers over that which is predicted for a sequence in which the print jobs are printed in the same order that they arrive at the print job scheduler by reducing a total number of periods of time in which the plurality of printers are in a non-operational mode.

In accordance with another aspect of the present exemplary embodiment, a storage medium comprising information for scheduling print jobs for printing by a plurality of associated printers is provided. The storage medium includes information that for each of a plurality of print jobs: determines a number of pages of a first print modality for the print job, determines a number of pages of a second print modality for the print job, and determines a file header based on the number of pages of the first print modality and the number of pages of the second print modality in the print job. The storage medium further includes information which associates the file header with the print job and information which transmits the print job along with the file header to an associated print job scheduler configured for scheduling the print jobs and information which schedules the print jobs for printing in a sequence based at least one of: minimizing a number of periods of time where one of the printers is in a non-operational mode and maximizing continuous run time for at least one of the printers.

In accordance with another aspect of the present exemplary embodiment, a device for scheduling print jobs in a printing assembly is provided. The device includes a print driver, the print driver determining a number of pages of a first print modality for a print job and a number of pages of a second print modality for the print job, and determining a file header based on the number of pages of the first print modality and the number of pages of the second print modality in the print job. The print driver transmits the print job along with the file header to a print job scheduler. The print job scheduler schedules the print job for printing in a sequence of print jobs based on at least one of minimizing a number of periods of time where an associated printer is in a non-operational mode and maximizing continuous run time for at least one of the associated printers.

The term "marking device" or "printer," as used herein, broadly encompasses various printers, copiers, or multifunction machines, xerographic or otherwise, unless otherwise defined in a claim.

A "printing assembly," as used herein incorporates a plurality of marking devices, and may include other components, such as finishers, paper feeders, and the like.

A "print job" or "document" is normally a set of related sheets, usually one or more collated copy sets copied from a set of original print job sheets or electronic document page images, from a particular user, or otherwise related.

The term "print medium" herein refers to a usually flimsy physical sheet of paper, plastic, or other suitable physical print media substrate for images, whether precut or web fed.

The term "finisher" or "finishing station" as broadly used herein, is any post-printing accessory device such as an inverter, reverter, sorter, mailbox, inserter, interposer, folder, stapler, collater, stitcher, binder, over-printer, envelope stuffer, postage machine, output tray, or the like. In general, a finishing station can only process one document at a time.

The term "job output destination" is any post printing destination where the printed pages of a document are together, ordered in a sequence in which they can be assembled into in the finished document, such as a finisher or finishing station, as described above, or a temporary holding location.

DETAILED DESCRIPTION

A scheduling component for a printing system enables improvements in reliability of the printing system to be achieved by reducing the downtime or maximizing the continuous running time, for at least one of the printers, and in one embodiment, all of the printers in the printing system.

Reliability can be evaluated by studying the number of unscheduled maintenance visits for a printing system, or for a group of printing systems. Unscheduled maintenance visits are those which arise from a printing system failure, rather than through a planned maintenance schedule. From the data, an unscheduled maintenance rate (UMR) can be determined which is the average number of unscheduled maintenance visits per million prints (or other suitable number of prints). Data taken for a large number of printing systems has shown that generally, as the average monthly printing volume (AMPV) increases, the UMR decreases (i.e., reliability increases). Specifically, the customers who create larger AMPV are generally printing significantly longer jobs, thus increasing the average continuous runtime of the machine per job. The present scheduling system allows increases in reliability to be achieved, in terms of decreased UMR, without the increase being necessarily tied to a corresponding increase in the AMPV. For example, by scheduling the printing of jobs to maximize the continuous 'uptime' for each printer in a printing system, a higher reliability for the printing system is achieved.

Figure 1:
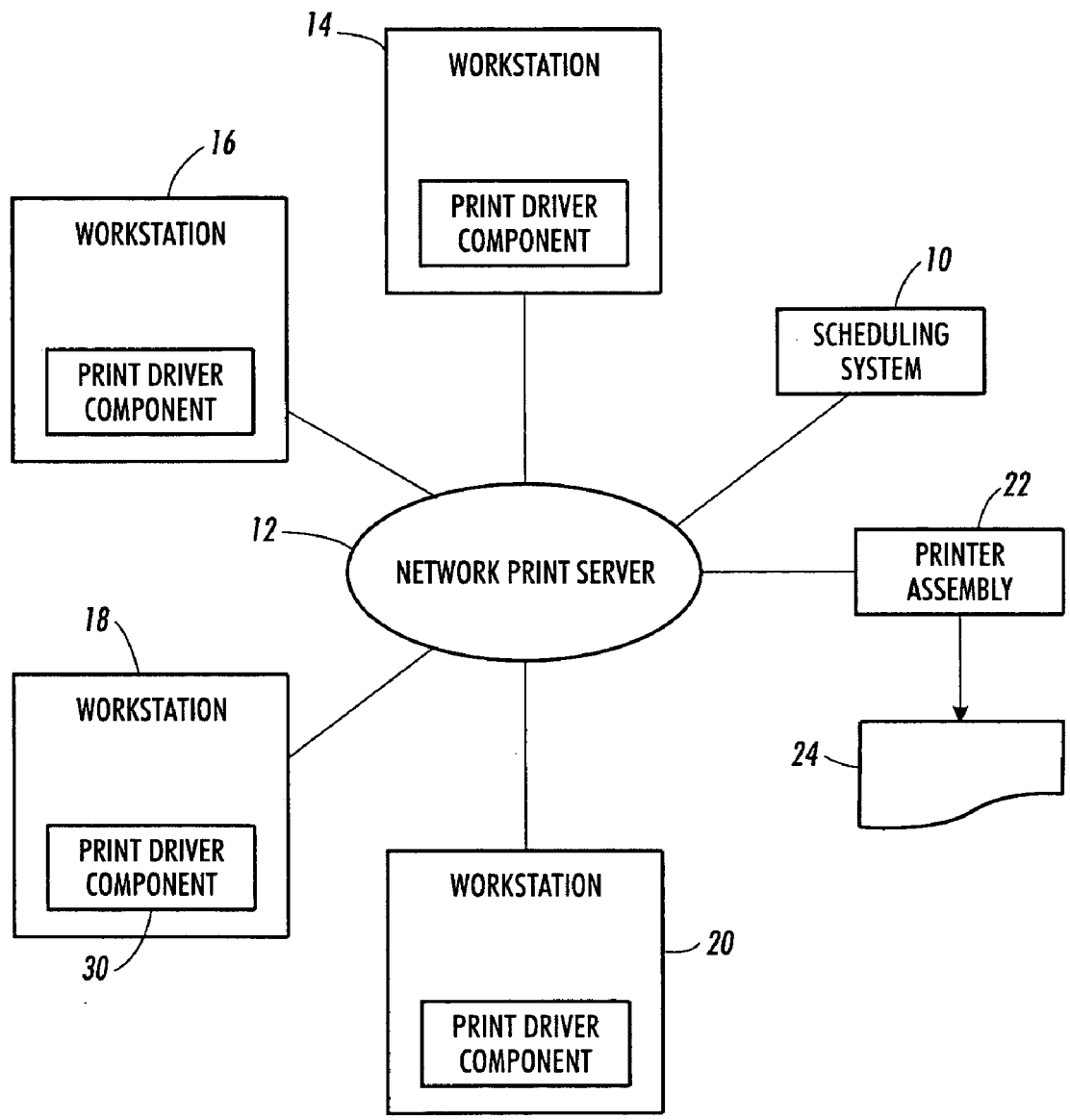
FIG. 1 is a schematic view of a printing system according to an exemplary embodiment.

With reference to FIG. 1, an exemplary networked printing system incorporating a document scheduling system 10 is shown. The networked printing system includes a network print server 12 and one or more workstations 14, 16, 18, 20 (four in the illustrated embodiment) and a printing assembly 22 capable of printing onto a print medium 24, all interconnected by links 26. The links 26 can be a wired or wireless link or other means capable of supplying electronic data to and/or from the connected elements.

Each of the workstations 14, 16, 18, 20 is associated with a print driver component 30. The print driver component 30 pre-scans a print job, such as a document file and determines:

a) the number of pages of a first print modality to be printed on a first type of printer, e.g., the number of black only pages; and b) the number of pages of a second print modality to be printed on a second type of printer, e.g., the number of custom color pages or process color pages.

Where more than two types of printer/type of print are available for use in the document, the print driver component 30 determines the number of pages of each type, for example, the print driver component determines:

a) the number of black pages;

b) the number of process color pages;

c) the number of custom color pages; and, optionally, d) the number of magnetic ink character recognition (MICR) pages.

Process color printers generally employ three inks, magenta, cyan, and yellow, and optionally black. Different colors are achieved by combinations of the three primary colors. Custom color printers are fed with a premixed ink which provides a specific color, generally with a higher color rendering accuracy than can be achieved with a process color printer. MICR printing applies a magnetic strip or other detectable portion to the page, for example, as a security feature for bank notes. The number of modalities is not limited to those listed herein. In general, the print driver evaluates the number of pages of each print modality which is available for printing in the printer assembly.

While it is contemplated that marking devices may be capable of generating more than one type of print modality, for ease of reference, the marking devices described herein will be referred to as black only, process color, and custom color marking devices.

Additionally, it will be appreciated that some of the pages will be formed by use of more than one modality (mixed modality pages). For example, a page of a document may have a custom color header applied by a custom color printer and a body of text in black or process color applied by a different printer from that used for the custom color. In such a case, the same page will be counted twice (or more), i.e., once for each print modality. Thus, a document of, for example, 40 pages, where twenty are black and twenty are mixed modality pages to be printed with both black and custom color printers, will be registered by the scheduling system as having:

a) forty black pages;
b) no process color pages; and
c) twenty custom color pages.

The print driver component 30 places the information regarding the number of pages of each print modality into a file header and sends it to the network server 12, along with the document file. The network print server 12 stores and spools the document file, including the file header. The print driver component 30 may alternatively convert a document file into a postscript print ready file. This postscript print ready file includes a header which the information on the number of pages of each print modality in the document. The postscript print ready file is then sent to the network print server 12.

In yet another embodiment, the network print server 12, rather than the print driver, identifies color and black only pages in a document. For example, the network print server includes software which identifies whether a page is a black and white page by examining data within the color separations for the page. Such a system is described, for example, in U.S. Pat. No. 6,718,878 to Grosso, et al., which is incorporated herein by reference.

The print job scheduler 10 receives the headers for a plurality of print jobs in a queue and orders them in a sequence, as will be described in greater detail below. The printing assembly 22 subsequently prints the jobs onto the print medium 24, e.g., sheets of paper, according to the scheduled sequence.

While the print driver component 30 is shown separately from the network print server 12 and printing assembly 22 it is appreciated that the print driver component could be incorporated into the particular network print server 12 or printing assembly 22. In general, FIG. 1 represents an embodiment in which the document scheduling system 10 is incorporated or otherwise connected to a networked printer environment. However, the document scheduling component 10 can be located anywhere.

The network print server 12 may include the document scheduling component 10 or the document scheduling component can be included in the printing assembly 22. The document scheduling component 10 is capable of scheduling the print jobs based on one or more of minimizing downtime, increasing the continuous running time of one or more marking devices, and minimizing the number of times one or more printers initiates a shut down procedure (hereinafter all of which will be referred to as "reliability improvement factors" or RIF) in the printing system and/or based on a custom scheduling scheme. The custom scheduling scheme may include a priority override feature which allows the user to set a print priority regardless of the RIF.

Figure 2:
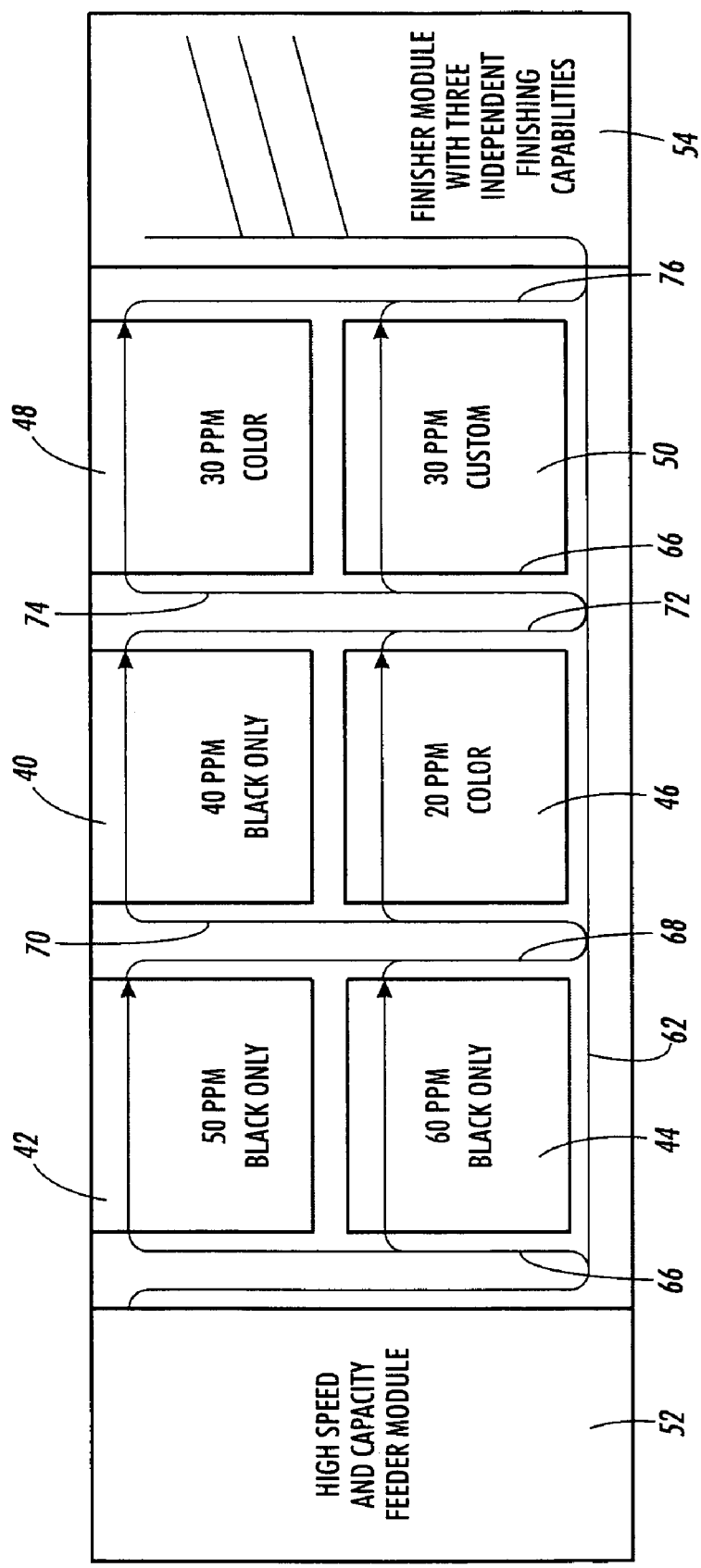
FIG. 2 is a schematic sectional view of a first embodiment of a printing assembly for the printing system of FIG. 1.

As shown in FIG. 2, the printing assembly 22 includes several printers, all communicating with the network print server 12. For example, a printing assembly 22 may consist of several identical or different, parallel printers connected through flexible paper paths that feed to and collect from these printers. At any one time, a plurality of the printers can be printing. More than one of the printers can be employed in printing a single print job. More than one print job can be in the course of printing at any one time. By way of example, a single print job may use one or more printers of a first modality (such as black only) and/or one or more printers of a second modality (such as process color).

FIG. 2 illustrates an exemplary printing system with three black only printers 40, 42, 44 (illustrated as 40 prints per minute (ppm), 50 ppm and 60 ppm, printers, respectively), two process color printers 46, 48 (illustrated as 20 and 30 ppm printers, respectively) and one custom color printer 50 (illustrated as a 35 ppm printer). It will be appreciated that the printing system may include fewer or more printers, depending on the anticipated monthly print volume.

In the illustrated embodiment, all of the printers are fed with print media from a single high speed and capacity feeder module 52, although it will be appreciated that one or more of the printers may be fed from separate feeders. A finisher module 54, with three separate finishing capabilities 56, 58, 60, here represented by output trays, receives printed media from any one of the clustered printers. A print media highway 62 extends from the feeder module 52 to the finisher module 54 from which pathways 66, 68, 70, 72, 74, 76, etc. feed the print media to and from selected ones of the printers. The highway 62 and/or pathways 66, 68, 70, 72, 74, 76 may include inverters, reverters, interposers, bypass pathways, and the like as known in the art to direct the print media between the highway and a selected printer or between two printers. It will be appreciated that the printers may be duplex or simplex printers and that a single sheet of paper may be marked by two or more of the printers or marked a plurality of times by the same printer, before reaching the finisher module.

The printing system with which the present scheduling system is used may incorporate "tandem engine" printers, "parallel" printers, "cluster printing," "output merger" or "interposer" systems, and the like, as disclosed, for example, in U.S. Pat. Nos. 5,568,246; 4,587,532; 5,570,172; 5,596,416; 5,995,721; 4,579,446; 6,654,136; and "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced." One example of a sheet "interposer" is described in U.S. Pat. No. 5,489,969 to Soler, et al. Also noted are U.S. Pat. No. 6,554,276, to Jackson, et al., and U.S. Pat. No. 6,607,320, to Bobrow, et al., the systems of which can be used with the present scheduling system. By way of an example of a variable vertical level, rather than horizontal, "universal" input and output sheet path interface connection from a single printer to a single finisher which may be used, there is U.S. Pat. No. 5,326,093 to Sollitt. Sollit demonstrates additional possible optional input and/or output features which may be used here, since various different printers and third party finishers may have different sheet output levels and sheet input levels. All of the above-mentioned patents are incorporated herein by reference.

Having a plurality of printers 40, 42, 44, 46, 48, 50 capable of independent contemporaneous operation and capable of feeding printed pages to a common finisher module 54 enables a wide variety of scheduling options. For example, a single large print job of black only pages may be split between the three black only printers, which feed selected pages to the same finisher, e.g., finishing station 56. Two or more print jobs may be printed contemporaneously by feeding the outputs of selected printers to different finishing stations. For example, a first job may use the first black printer 40 to print black only pages and the first color printer 48 to print color pages, their combined outputs being sent to the first finishing station 56, while the second print job may contemporaneously use the second black printer 42 and optionally the third black printer 44 to print the black only pages with the color pages being printed on the second color printer 46, the combined outputs of printers 42, 44, 46 being sent to a second finishing station 58. At the same time, a third print job, using only custom color, may be running on the custom color printer 50 and sending its output to the third finishing station 60. Since the number of black and color pages may require different printing times, a fourth printing job may commence with use of one or more of the printers which has completed the pages for the first, second, or third print jobs while the rest of the printers are still occupied with the first second, or third print jobs.

The scheduling system 10 takes into account the different speeds of the printers, the finishing requirements, and the like in scheduling the print jobs. The scheduling system 10 may also determine a route for each sheet of each of the print jobs through the printing assembly so that the sheets arrive at the appropriate finishing station in the correct order for assembling the finished document.

Systems consisting of multiple parallel, alternative modules that are connected through flexible paths and even loops of the type illustrated in FIG. 2 offer a multitude of alternative operations to produce the same outputs. For previous, in-line systems with few alternative capabilities, the entire system was usually stopped when one of its modules (e.g., a printer) went off-line, perhaps when a fault occurred, except for specific modules, such as feeder modules in printing systems. With the types of parallel systems described above, it is possible to continue using all available system capabilities by planning and scheduling around the off-line module as necessary. For example, in the event that one of the printers goes off-line, the scheduling system reschedules the remaining print jobs in the queue to account for the off-line printer.

The network print server 12 and/or scheduling system 10 assigns the print job to the appropriate modality of printer (e.g., black only, process color, or custom color) selected by the workstation 14, 16, 18, or 20. Where there is more than one printer of a particular print modality, the document scheduling component 10 determines which printer to use, depending on the RIF. The assigned printer's electronic subsystem (ESS) looks at the header information and document and converts the document into a bitmap. Once the document is converted into a bitmap, the document is sent to the printer's image output terminal (IOT) and the printer starts printing the job or pages thereof.

The document scheduling component orders the jobs in the queue into a job sequence which takes into account the RIF. Thus, the first job to arrive at the network print server could be the last job to be printed.

The document scheduling component schedules the printing of jobs from the queue of possible jobs to optimize one or more RIF. In one embodiment, the document scheduling component examines the printing format requirements, e.g., black, process color, or custom color for all pages of all jobs in the queue and creates a schedule for running jobs in the queue that maximizes the continuous uptime (minimizes on/off cycles) of all print engines.

U.S. Published Application Nos. 2004/0085561, 2004/0085567, and 2004/0088207 to Fromherz, published May 6, 2004, which are incorporated herein in their entireties by reference, disclose exemplary scheduling systems suited to use with a reconfigurable printing system. Such a scheduling system may be used to schedule the print sequence herein, by introducing constraints which maximize the continuous uptime and/or minimizes on/off cycles of at least one, and in one embodiment, all printers in the printing assembly.

Figure 3:
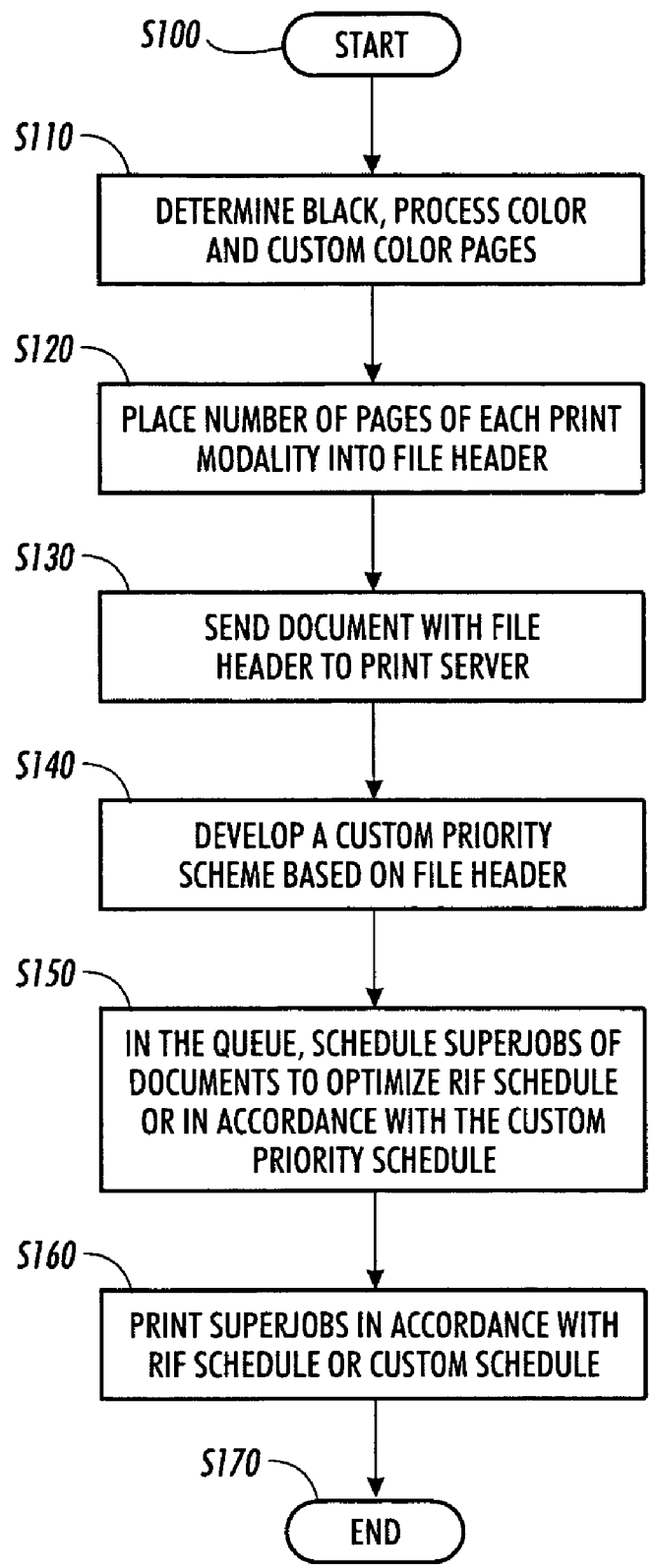
FIG. 3 shows a flowchart outlining one exemplary embodiment of a method for scheduling documents in a networked printer environment in accordance with the systems and methods described herein.

FIG. 3 shows a flowchart outlining one exemplary embodiment of the method for scheduling documents in a networked printer environment in accordance with the systems and methods described herein. The process begins in step S100, and continues to step S110, where the system, during a Page Description Language (PDL) conversion scan, determines the number of pages of each print modality for the document. Next in step S120, the system places the number of pages of each print modality in a file header. Then, in step S130, the system sends the PDL converted document with the file header to a print scheduler, such as a print server. Control then continues to step S140. In step S140, the system develops a custom priority scheme based on the file header. The custom priority scheme allows a user to override any RIF generated priority. For example, if a user has an important print job, the custom priority scheme will allow this particular print job to be advanced before other prints jobs, regardless of their effect on RIF. The custom priority scheme will look at the any override flags that may be set and schedule jobs accordingly. Then in step S150, the scheduling system schedules the documents for printing in a plurality of super jobs which are ordered to optimize one or more RIF. Each super job includes one or more individual print jobs selected from the queue. The maximum number of print jobs which can be performed contemporaneously depends primarily on the number of available finishing stations, but may also be influenced by the number of printers of each print modality in the printing assembly and/or the number of pages of each type of print modality in the particular job. For example, where there are three finishing stations, as shown, the maximum number of jobs which can generally be bundled into a super job is three. The super jobs are assembled into a schedule to optimize one or more RIF. For example, using relatively standard optimization routines, the jobs are clustered into super jobs and the super jobs are ordered to maximize the continuous runtime, or, conversely, to minimize on-off cycles for each printer. Determining which print jobs to bundle into a super job and which order to sequence the super jobs can be determined by an iterative process in which the scheduling system proposes a number of super jobs to accommodate all print jobs in the queue and places the super jobs in a sequence and evaluates one or more of the RIFs. The scheduling system modifies the proposed super jobs and/or schedule sequence and revaluates the selected RIF(s). This process is repeated until an optimal solution is found, or until a near optimal solution is found. For example, the software may continue the optimization routine for a fixed period of time.

In step S160, if no priority override flag is in place, the printing system prints documents according to the schedule. Control then goes to step S170, where the control process ends.

As shown in FIG. 1, the document scheduling system 10 is preferably implemented either on a single program general purpose computer or separate program general purpose computer. However, the document scheduling system can also be implemented on a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowchart in FIG. 3 can be used to implement the document scheduling system.

The disclosed method may be readily implemented in software using object or object-oriented software development environments that provide portable source code that can be used on a variety of computer or workstation hardware platforms. Alternatively, the disclosed document scheduling system may be implemented partially or fully in a hardware using standard logic circuits or VLSI design. Whether software or hardware is used to implement the systems in accordance with the exemplary embodiments is dependent on the speed and/or efficiency requirements of the system, the particular function, and the particular software or hardware systems or microprocessors or microcomputer systems being utilized. The document scheduling system and methods described above, however, can be readily implemented in hardware or software using any suitable systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of the exemplary embodiments described herein can be implemented as a routine embedded on a personal computer such as Java® or CGI script, as a resource residing on a server or graphics work station, as a routine embedded in a dedicated print management system, web browser, web TV interface, PDA interface, or the like. The document RIF scheduling system can also be implemented by physically incorporating the system and method into a software and/or hardware system, such as the hardware and software of a graphics workstation or dedicated print management system.

In one embodiment, the scheduling system can be adapted to use with a variety of different printing systems. For example, the scheduling system may be programmed to receive inputs on the number, print modality, and configuration of the printers, and finishing stations in the printer assembly. The scheduling system thus can be programmed to modify the optimization routine according to the number of printers of each modality, their print capabilities, in terms of ppm, the number of finishing stations, and the like.

By way of illustration, a mixed mode printing assembly similar to that shown in FIG. 2 but with no custom color capability (or where the custom color is not required for a set of print jobs in a queue) has the following characteristics:

a. It includes five print engines with the following print mode and productivities:
 1. three black only print engines that print at 40 ppm, 50 ppm and 60 ppm, respectively, and
 2. two process color print engines that print at 20 ppm and 30 ppm, respectively;

b. It has the capability of printing three jobs simultaneously (using the three finishing modules illustrated in FIG. 2); and c: images from two or more print modalities can be combined to produce the same job, e.g., each of the black printers can be used to produce a portion of the black pages in a single job.

Assume that on a particular day there are 26 simplex print jobs that cumulatively are composed of 22,500 black only pages and 7500 pages with some process color. Assume also that all 26 jobs in the print queue are of equal importance and initially are present in the order seen in TABLE 1.

TABLE 1

The 26 jobs for a single day's printing as found in the queue

| JOB ORDER IN THE QUEUE | NO. OF COPIES | COLOR PAGES PER COPY | BLACK ONLY PAGES PER COPY |
|---|---|---|---|
| 1 | 150 | 0 | 2 |
| 2 | 100 | 5 | 10 |
| 3 | 100 | 0 | 33 |
| 4 | 25 | 8 | 8 |
| 5 | 30 | 10 | 5 |
| 6 | 35 | 0 | 10 |

TABLE 1-continued

The 26 jobs for a single day's printing as found in the queue

| JOB ORDER IN THE QUEUE | NO. OF COPIES | COLOR PAGES PER COPY | BLACK ONLY PAGES PER COPY |
|---|---|---|---|
| 7 | 10 | 20 | 30 |
| 8 | 40 | 20 | 0 |
| 9 | 20 | 10 | 60 |
| 10 | 30 | 50 | 0 |
| 11 | 200 | 0 | 15 |
| 12 | 200 | 0 | 7 |
| 13 | 20 | 15 | 25 |
| 14 | 100 | 1 | 5 |
| 15 | 50 | 30 | 10 |
| 16 | 20 | 20 | 0 |
| 17 | 5 | 20 | 200 |
| 18 | 80 | 0 | 30 |
| 19 | 20 | 30 | 0 |
| 20 | 50 | 10 | 2 |
| 21 | 100 | 0 | 23 |
| 22 | 100 | 5 | 15 |
| 23 | 150 | 0 | 4 |
| 24 | 10 | 20 | 40 |
| 25 | 10 | 50 | 0 |
| 26 | 60 | 10 | 0 |

In the present example, there are no custom color pages and no mixed modality pages in any of the document jobs.

Figure 4:
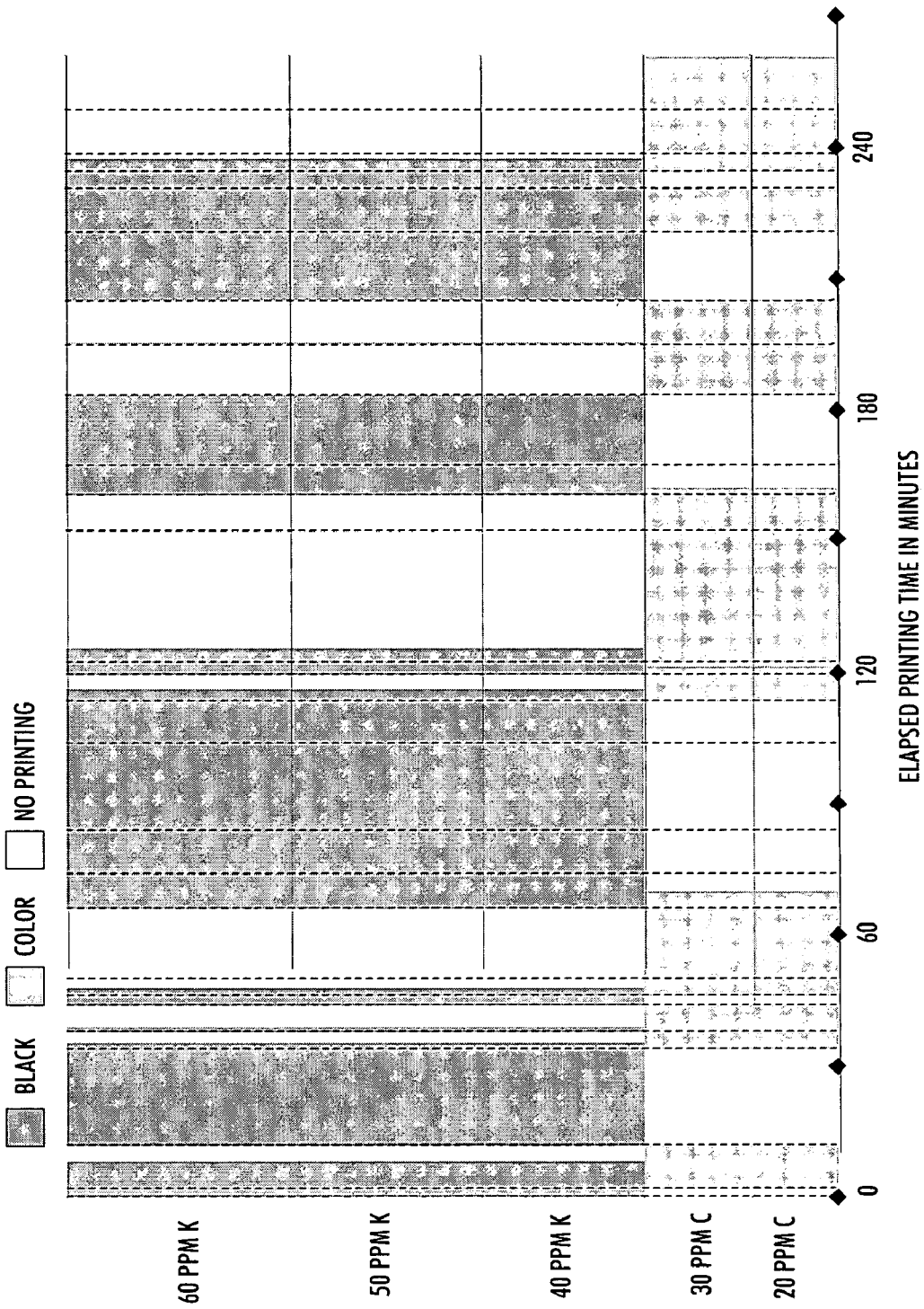
FIG. 4 shows a time history of printing twenty-six jobs one-at-a-time as found in an exemplary queue.

If each job were to be printed, one-at-a-time, in the order found in the queue, the time history of the cumulative printing for the day would be as seen FIG. 4. In FIG. 4, printing in black only is connoted by dark gray areas, color by light gray areas and not printing by white areas. Dashed vertical lines represent the beginning of a job. The total time to print all 30,000 pages is about 260 minutes. This assumes zero set up time between jobs and thus that printers can print continuously from one job to the next as called upon. The white areas in FIG. 4 connote times of no printing activity for a particular printer and thus each change from dark gray to white or light gray to white represents an on-off cycle for a printer. Counting up these cycles it is seen that: the two color printers go through eight on-off cycles, while the three black-only printers also go through eight on-off cycles. Thus there are 40 printer on-off cycles total.

Now consider printing up to three jobs-at-a-time by creating super jobs. The actual grouping of individual jobs within super jobs is an outcome of an optimization to minimize the total number of printer on-off cycles. The steps in so doing are:

a. Identify, within each job, by use of a print driver,
 i. the number of black only pages,
 ii. the number of process color pages,
 iii. the number of custom color pages b. Use an optimization routine to schedule the order of job printing to minimize on/off cycles for each printer.

c. This process is enhanced by a physical printer architecture that has multiple output destinations, e.g., finishers, thus enabling the capability of printing multiple jobs simultaneously, as seen in the example given by the creation of 'super jobs'.

Table 2 shows the grouping of 'super' jobs, labeled A-K.

TABLE 2

| SUPER JOB | COMPOSED OF JOBS | TOTAL COLOR PAGES | TOTAL BLACK ONLY PAGES | USING PRINTERS |
|---|---|---|---|---|
| A | 8, 9, 16 | 2000 | 0 | 20 PPM C, 30 PPM C |
| B | 25, 15, 22 | 2500 | 2000 | 20 PPM C, 30 PPM C, 40 PPM K |
| C | 24, 5, 6 | 500 | 900 | 20 PPM C, 30 PPM C, 40 PPM K. 50 PPM K |
| D | 13, 7, 2 | 1000 | 1800 | 20 PPM C, 30 PPM C, 40 PPM K. 50 PPM K |
| E | 14, 20, 18 | 600 | 3600 | 30 PPM C, 40 PPM K. 50 PPM K, 60 PPM K |
| F | 9, 4, 23 | 400 | 2000 | 30 PPM C, 40 PPM K. 50 PPM K, 60 PPM K |
| G | 17, 16, 10 | 500 | 2500 | 30 PPM C, 40 PPM K. 50 PPM K, 60 PPM K |
| H | 3 | 0 | 3300 | 40 PPM K. 50 PPM K, 60 PPM K |
| I | 11 | 0 | 3000 | 40 PPM K. 50 PPM K, 60 PPM K |
| J | 21 | 0 | 2300 | 40 PPM K. 50 PPM K, 60 PPM K |
| K | 12, 1 | 0 | 1700 | 40 PPM K. 50 PPM K. 60 PPM K |

Figure 5:
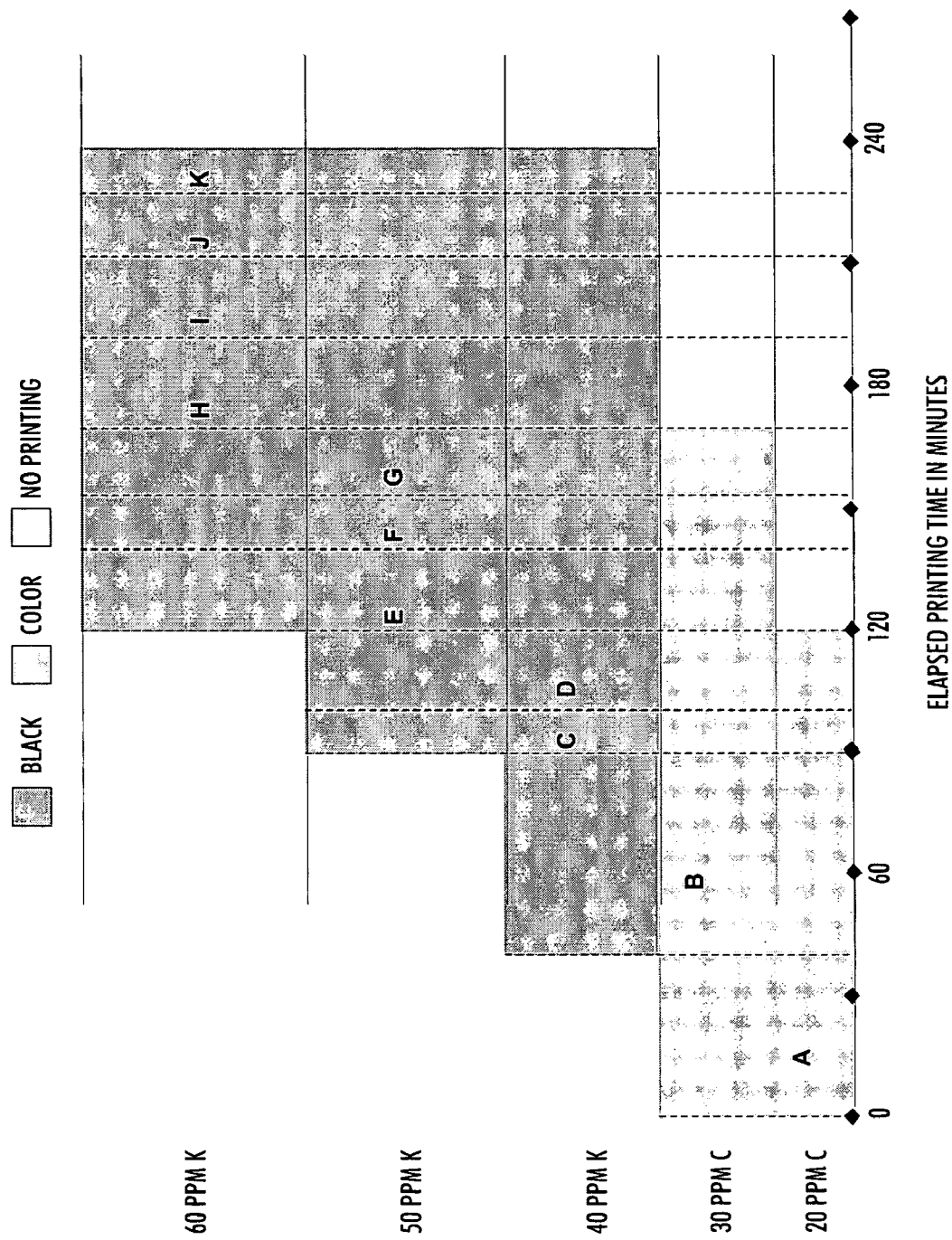
FIG. 5 shows a time history of printing the same twenty-six jobs ordered to minimize on/off cycles of the printers.

FIG. 5 shows the time history of printing the 'super jobs.' As can be seen, the total time to print all jobs, comprising 30,000 pages cumulatively, is about 237 minutes, somewhat less than the 260 minutes when all jobs were printed one-at-a-time in the order found in the queue. Additionally, there are only five on-off cycles total for all printers, i.e., one for each printer, compared to 40 on-off cycles when all jobs were printed one-at-a-time in the order found in the queue.

In practice, one or more of the printers may have more than one on-off cycle.

Thus, it will be appreciated that it is possible to increase the reliability of a mixed (color/black) printing assembly composed of multiple printers by scheduling a day's printing to dramatically reduce the number of on/off cycles.

In an OFF (non-printing) period, one or more of the printer functions is typically switched off or allowed to go into a "non-operational" mode where the printer is not ready for printing, such as a low energy mode. Where an optimized printing schedule determines that more than one on-off cycle will be needed for one or more printers (i.e., more than the beginning ON and ending OFF), the scheduling system determines how long the OFF period will be and, for the particular printer, determines whether the printer should completely cycle down, or only shut down some of its operational functions. For example, if the OFF period is determined to be about two minutes, the printer may be capable of going to an intermediate low energy mode, where some, but not all the functions are switched to a non-operational mode. This is because some of the printer functions are more subject to damage than others when not in continuous use. For each printer component, there is generally a predetermined period, after which the component is switched to a non-operational mode to avoid potential damage to the printer.

In one embodiment, the print scheduler instructs a printer to switch to a non-operational mode, in a designated OFF period, only those functions which are likely to suffer if they are allowed to be left ON (i.e., in an operational mode) for that period of time. Alternatively, or additionally, the scheduling system may be programmed to override a normal shut down where it is determined that the printer will need to be in the ON mode within a short time. For example, one type of printer may be automatically scheduled to begin cycling down where a consecutive sheet does not arrive within eight minutes. If the scheduling system determines that the next sheet will arrive only a short time after the nominal shut down is due to commence, e.g., at 10 minutes after the arrival of the previous sheet, it will override the automated shutdown, maintaining the printer in an ON condition (or in a condition where it is closer to the ON condition). In this way, even where OFF cycles are required due to the particular jobs in the queue, the effects on reliability are minimized.

While maximizing continuous run time and minimizing the number of ON/OFF cycles can generally be achieved by the same scheduling sequence, there may be occasions where only one of these can be satisfied. Additionally, one of the printers may be more prone to damage than others. In such a case, the optimum schedule sequence ensures, where possible, that the damage-prone printer undergoes as few ON/OFF cycles as possible.

In some cases, a print job may arrive at the scheduling system 10 after printing of the schedule of print jobs has commenced. The scheduling system 10 optionally reorders the sequence, based on the remaining jobs in the queue, including the late arriving document.

The operation of the print driver will be described with reference to an exemplary embodiment running in Microsoft Windows. When a workstation which is running under an operating system such as MicroSoft Windows invokes printing, a print driver is called to convert the contents of the document into a print data stream such as PostScript or PCL. The print driver is responsible for understanding how to translate the objects at the application level, such as character strings of a specific font, graphics, images etc. into the data stream of the printing assembly. The print driver is typically provided by the printer manufacturer. In the present case, a print driver is provided to support the functions required to separate attributes of the job that are used to enhance scheduling of pages in the printing system.

In formatting the page into a print data stream, Windows uses a software interface called a Graphics Device Interface (GDI) between the application and the print driver. The print driver is modeled as a software object that is contained in a class known as the "CDC" class that defines a class of device context objects. The member functions of this class contain functions provided by the print driver that can translate GDI objects and control into the print data stream. One reference for GDI printing for MicroSoft Windows is on the MicroSoft website.

The printing protocol provided between the application and print driver is able to support the concept of a job and pages in a job. It is up to the application to define these logical breaks in the document, but the GDI printing protocol provides member functions in the CDC that communicate this logical structure to the driver.

For example, as noted in the GDI website: to print a multipage document, the framework and view interact in the following manner. First the framework displays the Print dialog box, creates a device context for the printer, and calls the StartDoc member function of the CDC object. Then, for each page of the document, the framework calls the StartPage member function of the CDC object, instructs the view object to print the page, and calls the EndPage member function. If the printer mode must be changed before starting a particular page, the view object sends the appropriate escape code by calling the Escape member function of the CDC object. When the entire document has been printed, the framework calls the EndDoc member function.

As will be appreciated from this description, the print driver has access to the logical structure of the document including individual pages. This satisfies the first requirement that a printing system has in isolating individual pages in the job at the GDI level. Each page is marked by this interface and the print driver uses this to isolate pages in the job. Between the StartPage and EndPage functions, the application uses either the OnPrint or OnDraw member functions to render elements of the page. A full description of the Microsoft documentation on the printer driver interfaces is to be found on the MicroSoft website.

For each document to be rendered, the GDI calls the following functions:

```
DrvStartDoc
For each physical page {
    DrvStartPage
    DrvStartBanding
    For each banding surface {
        DrvQueryPerBandInfo
        Rendering operations
        DrvNextBand
    }
    DrvSendPage
}
DrvEndDoc
```

It should be borne in mind that this sequence provides only one possible command set. One skilled in the art would readily appreciate that individual instructions could be varied in form and that the sequence in which steps are performed could vary, all of which embodiments are contemplated by the disclosure and scope of the claims herein.

The band rendering loop contains code that interprets the graphics object. Without going into the details of function calls at the band rendering level, means are provided to convert the representations of graphics and image objects to a format that is understood by the printer. Part of the representation of these objects is the color of the object. In this way the printer driver can track the color of the objects on the page and tag pages for monochrome, highlight, or full color. This information can be sent as meta data with the print job to a function in the controller that separates out pages and directs them to the appropriate printer based on page attributes defined in this meta data.

While the description given here is specific to MicroSoft Windows, other operating systems such as Linux and MAC OS can be configured to provide similar functions as provided by the print driver. In some cases, the print driver may be logically complied with the application as opposed to a service of the operating system. In one embodiment, the supplier of the printing system supplies a dedicated print driver which is compatible with the printing system, which can be installed in the work station.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for scheduling print jobs for a plurality of printers, the method comprising:
for each of a plurality of print jobs, performing a conversion scan including:
with a print driver of a computer or a network print server:
determining a number of pages of a first print modality for a print job;
determining a number of pages of a second print modality for the print job;
determining a file header based on the number of pages of the first print modality and the number of pages of the second print modality in the print job; and
associating the file header with the print job;
transmitting the print job along with the file header to a print job scheduler implemented as software executed on a computer and placing the transmitted print job with other print jobs in a print job queue; and
with the print job scheduler, scheduling a sequence of printing the plurality of print jobs in the print job queue, without respecting print queue order, by the plurality of printers based on at least one of:
minimizing, for at least one of the plurality of printers, a number of periods of time during the sequence of printing where the at least one of the plurality of printers is in a non-operational mode; and
maximizing continuous run time during the sequence of printing for the at least one of the plurality of printers.

2. The method of claim 1, wherein the steps of determining a number of pages of the first modality and of the second modality are effected by a workstation print driver.

3. The method of claim 1, wherein the first modality comprises black printing and the second modality comprises color printing.

4. The method of claim 1, wherein at least one of the pages determined to be of the first print modality is also determined to be of the second print modality.

5. The method of claim 1, further comprising:
determining a number of pages of at least a third modality for the print jobs;
and wherein the step of determining a file header includes determining a file header based on the number of pages of the first modality, the number of pages of the second modality, and the number of pages of the at least a third modality in the print job.

6. The method of claim 5, wherein the first modality comprises black printing, the second modality comprises process color printing, and the at least a third modality comprises at least one of custom color printing and magnetic ink character recognition (MICR) printing.

7. The method of claim 1, wherein a set of the plurality of print jobs is scheduled to be printed contemporaneously as a super job.

8. The method of claim 1, wherein the step of scheduling the sequence of printing the plurality of print jobs includes for all the printers, minimizing a total number of periods of time where a printer is in a non-operational mode.

9. The method of claim 1, wherein each of the printers is preprogrammed to assume a non-operational mode by commencing an automated shut down after a selected time period of not printing.

10. The method of claim 9, further comprising:
overriding an automated shut down of a printer in a period of time where the printer is not printing a print job where it is determined that printing will recommence within a period of time which is not likely to appreciably increase a risk of damage to the printer.

11. The method of claim 1, further comprising:
detecting whether there is a priority override for a print job, wherein the priority override gives the print job a highest print priority; and
printing the print job with the highest print priority first regardless of the scheduled sequence.

12. A method for scheduling print jobs for a plurality of printers, the method comprising:

for each of a plurality of print jobs:
with a print driver of a workstation or a network print server:
determining a number of pages of a first print modality for a print job; and
determining a number of pages of a second print modality for the print job; placing the print jobs in a print job queue;
with a print job scheduler implemented as software executed on a computer, scheduling a sequence of printing the plurality of print jobs by the plurality of printers based on at least one of:
minimizing, for at least one of the plurality of printers, a number of periods of time during the sequence of printing where the at least one of the plurality of printers is in a non-operational mode; and
maximizing continuous run time during the sequence of printing for at least one of the plurality of printers, the scheduling including:
prior to printing, combining print jobs in the print job queue into a plurality of super jobs, at least one of the super jobs comprising the set of print jobs, the super job being scheduled for printing contemporaneously on a plurality of printers; and
arranging the super jobs into the sequence.

13. The method of claim 12, wherein a maximum number of jobs in any one of the super jobs is no greater than a number of job output destinations associated with the plurality of printers.

14. A method for scheduling jobs for a printing system, the method comprising:

for each of a plurality of print jobs, by a print driver of a computer:
determining a number of pages of a first print modality for the print job;
determining a number of pages of a second print modality for the print job;
determining a file header based on the number of pages of the first modality and the number of pages of the second modality in the print job; and
associating the file header with the print job;
transmitting the print job along with the file header to a print job scheduler implemented as software executed by a computer processor; and
with the scheduler, scheduling a sequence of printing for the plurality of transmitted print jobs by a plurality of printers, which sequence is predicted to lead to an increase in reliability of the plurality of printers over that which is predicted for a sequence in which the print jobs are printed in the same order that they arrive at the print job scheduler by reducing a total number of periods of time in which the plurality of printers are in a non-operational mode, the scheduling including, prior to printing, combining print jobs into a plurality of super jobs, at least one of the super jobs comprising the set of print jobs, the super job being scheduled for printing contemporaneously on a plurality of printers, and arranging the super jobs into the sequence.

15. A device for scheduling print jobs in a printing assembly comprising:

a print driver, the print driver determining, a number of pages of a first print modality for a print job and a number of pages of a second print modality for the print job, determines a file header based on the number of pages of the first print modality and the number of pages of the second print modality in the print job, and transmits the print job along with the file header to a print job scheduler, the print job being placed with other print jobs in a print job queue as the jobs arrive;
a the print job scheduler which scheduling the print job for printing in a sequence of print jobs drawn from the print job queue without maintaining the arrival order, based on at least one of:
minimizing a number of periods of time where an associated printer is in a non-operational mode; and
maximizing continuous run time for at least one associated printer, the scheduler combining print jobs into a plurality of super jobs, at least one of the plurality super jobs comprising the set of print jobs, a super job being scheduled for printing contemporaneously on a plurality of printers and arranging the super jobs into the sequence.

* * * * *